(12) United States Patent
MacNeil

(10) Patent No.: US 6,530,115 B2
(45) Date of Patent: Mar. 11, 2003

(54) DRYER

(76) Inventor: Daniel J. MacNeil, 90 Welham Road, Barrie, Ontario (CA), L4N 8Y4

( * ) Notice: Subject to any disclaimer, the term of this patent is extended or adjusted under 35 U.S.C. 154(b) by 45 days.

(21) Appl. No.: 09/845,929

(22) Filed: Apr. 30, 2001

(65) Prior Publication Data

US 2002/0157208 A1 Oct. 31, 2002

(51) Int. Cl.[7] .................................................. F26B 21/06
(52) U.S. Cl. ..................................... 15/316.1; 15/415.1
(58) Field of Search .............................. 15/316.1, 405, 15/415.1

(56) References Cited

U.S. PATENT DOCUMENTS

| | | | |
|---|---|---|---|
| 2,981,644 A | * | 4/1961 | Fain ........................... 15/316.1 |
| 3,279,093 A | * | 10/1966 | Dutton ....................... 15/316.1 |
| 4,335,526 A | | 6/1982 | Smith |
| 4,393,602 A | | 7/1983 | Smith |
| 4,683,668 A | | 8/1987 | Hondzinski et al. |
| 4,817,301 A | | 4/1989 | Belanger et al. |
| 4,872,238 A | | 10/1989 | Crotts et al. |
| 4,949,423 A | | 8/1990 | Larson et al. |
| RE33,334 E | | 9/1990 | Nelson |
| 5,093,951 A | | 3/1992 | Smith et al. |
| 5,280,665 A | | 1/1994 | McElroy et al. |
| 5,367,739 A | | 11/1994 | Johnson |
| 5,709,039 A | * | 1/1998 | Jones ........................ 134/57 R |
| 5,749,161 A | | 5/1998 | Jones |
| 5,875,565 A | * | 3/1999 | Bowman ..................... 34/666 |

* cited by examiner

Primary Examiner—Chris K. Moore
(74) Attorney, Agent, or Firm—Barnes & Thornburg

(57) ABSTRACT

A nozzle for an air blower of a car wash installation is designed to be adjustable to vary the direction of the air flow delivered by the blower. The blower has a tapered frustoconical nozzle that is oblique and is rotatably mounted at its base about an outlet of the blower. Upon rotation of the nozzle the direction of the delivered air flow moves in a conical path. Automated controls are provided to direct air flows from blowers in predetermined directions in the dryer section of an automated vehicle wash.

20 Claims, 7 Drawing Sheets

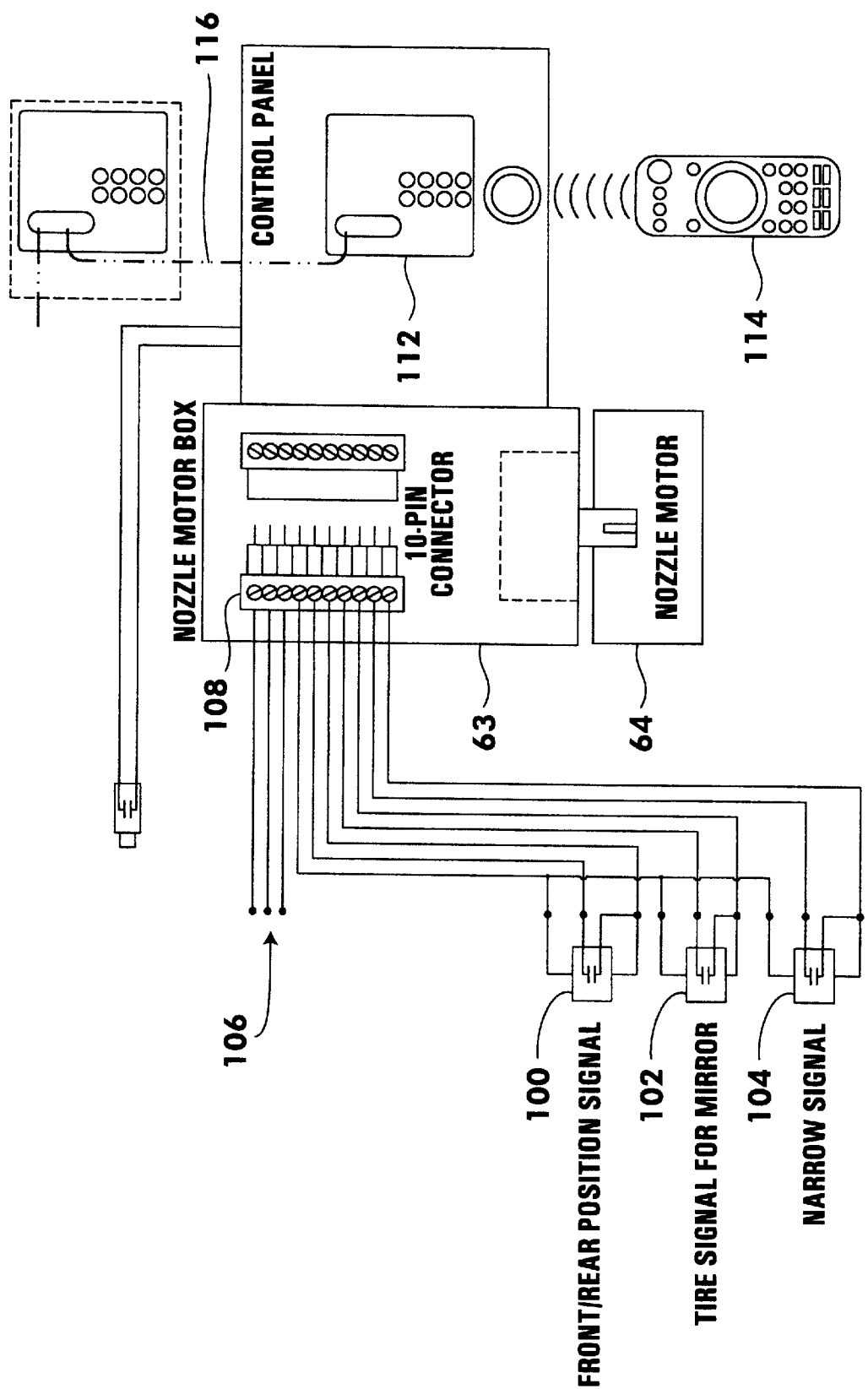

DRYER

BACKGROUND OF THE INVENTION

1. Field of the Invention

This invention relates to a new or improved nozzle for an air blower, to an air blower incorporating such a nozzle, and to a vehicle car wash installation utilizing such nozzles and air blowers.

2. Description of the Prior Art

Many forms of automated vehicle washing systems have been proposed and built in recent decades. Known automated car wash systems can generally be classified into two types, one in which the vehicle once moved into position remains stationary while the washing and drying equipment is moved relative to the vehicle, and a second wherein the vehicle is moved by a drive chain along an elongate track, along the length of the track passing by a succession of stations wherein washing, rinsing, waxing and finally drying operations are performed by automated equipment.

While such automated vehicle wash systems are generally efficient in terms of washing the vehicle, their performance in drying the vehicle is not in all cases satisfactory. Some automated car wash installations employ operators to apply a final manual wipe down treatment of automobiles to avoid spotting of the finish which results from imperfect automated drying operation.

Some of the problems with prior art vehicle drying systems are discussed in U.S. Pat. No. 5,367,739 Johnson which discloses a drying system incorporating oscillating air blowers which are positioned on the upright and cross beam of an arch type frame through which the vehicle passes.

Another prior art automated drying system is disclosed in U.S. Pat. No. 5,749,161 Jones wherein drying is effected by downwardly directed oscillating nozzles designed to drive water from the surfaces of the vehicle as the latter passes by the nozzles. However Jones requires a somewhat complex and expensive nozzle structure and adjustable drive system therefor to accommodate the required oscillating movement.

It is an object of the invention to provide a simplified adjustable nozzle system for an air blower, and one which is particularly suitable for use in automated drying systems in car wash installations.

SUMMARY OF THE INVENTION

The invention accordingly provides an air blower comprising: a housing enclosing a fan, said housing having inlet and outlet ports for flow of air through said housing upon operation of said fan; a nozzle carried by said housing to deliver a flow of air therefrom in a given direction; wherein said nozzle has a base carried on said housing in communication with and surrounding said outlet port, said nozzle being rotatable relative to said housing about an axis, said nozzle being oriented at an acute angle relative to said axis such that rotation of said nozzle about said axis is effective to adjust said given direction through a conical path.

Preferably the nozzle is of hollow tubular form and tapers in cross section from the base towards the outlet end, and is mounted on the blower housing by means of an annular bearing surrounding the outlet port. A drive element such as an endless flexible belt looped around the motor driven pulley provides control of rotation of the nozzle. The nozzle is preferably of tapered frusto-conical shape arranged so that the cone axis generally intersects the vehicle path as the latter passes the dryer installation. By adjusting the angular orientation of the nozzle, the air stream can be made to fall on any desired part of the vehicle that lies within the conical pattern which can be traced out by rotation of the nozzle.

The air blower is suitable for inclusion in a vehicle car wash installation dryer section wherein the vehicle to be dried is spanned by an arch frame that carries a plurality of such air blowers positioned so that the air flow can be directed onto a vehicle that moves relative to said frame. The frame may include further blowers in which the direction of air flow delivered is constant. The installation will preferably include a series of sensors to control operation of the blowers and orientation of the nozzles in response to the movement and instantaneous location of the vehicle being treated. Thus the nozzles may be controlled to direct air onto the front portion of the vehicle as it approaches, changing direction as the sides and top of the vehicle move past the arch frame, and then orienting towards the rear of the vehicle as it leaves the arch frame. One sensor may be located to be actuated in response to passing of a front wheel of the vehicle to direct a flow of air from one nozzle onto the corresponding rearview wing mirror of the vehicle.

The invention also provides a vehicle car wash installation including a frame having a series of blowers as described above positioned at locations on the frame to direct air flow to various parts of vehicles to be dried. In a typical installation the frame is of arch shaped and spans a track along which vehicles are dragged by a conveyor. However the invention is equally applicable to dryer installations wherein the vehicle is stationary and an arch frame is moved longitudinally back and front along the length of the vehicle.

BRIEF DESCRIPTION OF THE DRAWINGS

The invention will further be described by way of example only, with reference to the accompanying drawings wherein:

FIG. 7 is a schematic view of the control circuitry for the drying system.

DESCRIPTION OF THE PREFERRED EMBODIMENTS

Figure 1:
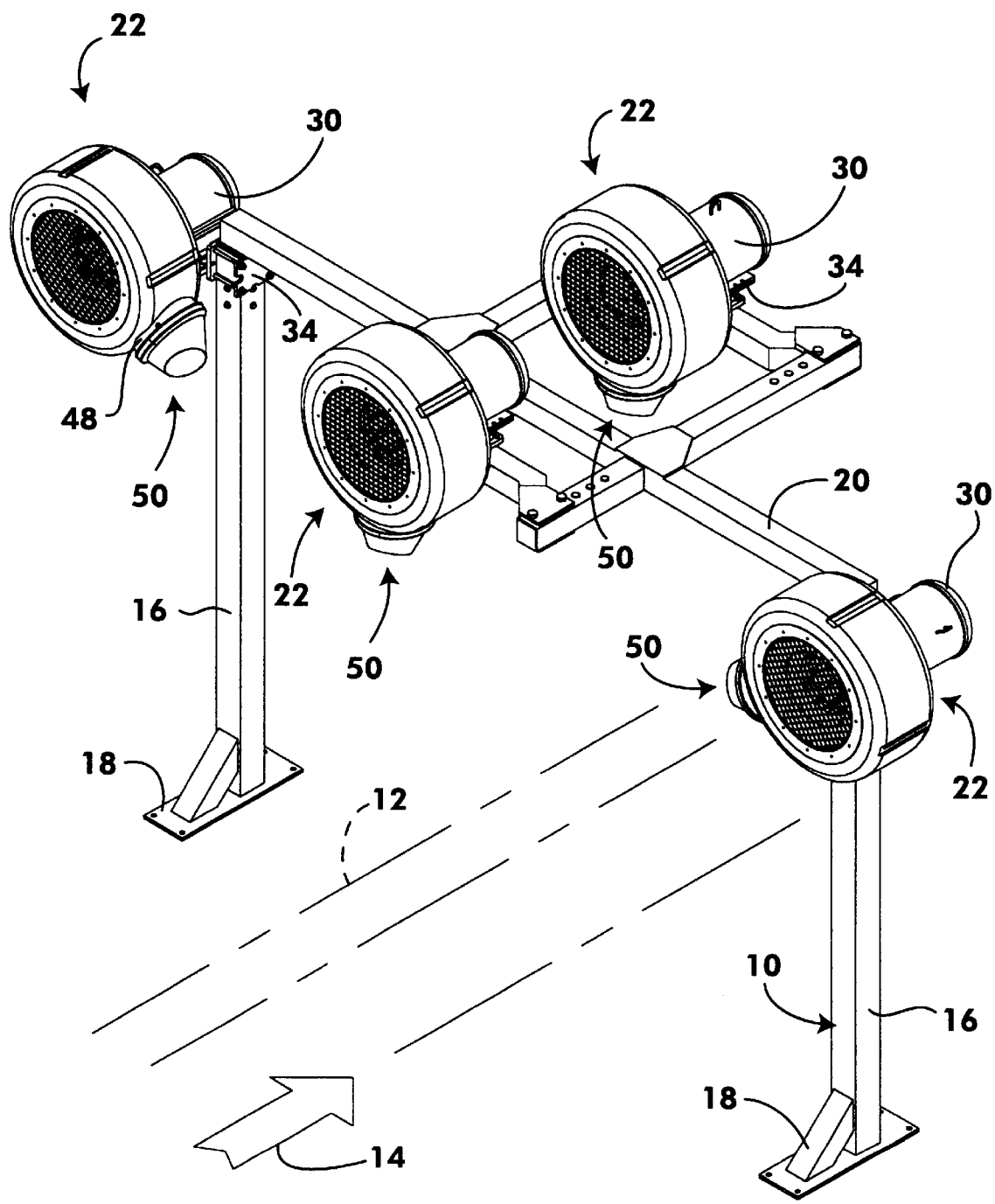
FIG. 1 is a somewhat schematic isometric view of a drying station for an automated car wash installation.

As seen in FIG. 1, the drying station comprises an arch-shaped frame 10 which spans a track indicated in broken lines at 12 along which vehicles (not shown) are advanced in the direction of the arrow 14 in an automated car wash installation. The arch frame 10 comprises a pair of upright posts 16 positioned on opposite sides of the track and each with a base plate structure 18 adapted to be secured to a support surface by anchor bolts or the like (not shown). The upper ends of the posts 16 are spanned by a horizontal beam 20 which is rigidly secured thereto, the posts, base plates and horizontal beam being fabricated of any suitable material, e.g. steel, or a corrosion resistant metal such as aluminium or an aluminium alloy.

The arch frame 10 is adapted to support a number of dryer blowers 22 (4 of which are shown in FIG. 1) at various locations above and laterally of vehicles passing along the track 12.

Each of the blowers 22 comprises a cylindrical housing 24 which encloses a fan impeller 26 (FIG. 4) rotatably mounted therein and carried on the drive shaft 28 of an electric motor 30 which is bolted to a back plate 32 which is releasably attached to the housing 24 by screws. The motor 30 in turn is carried on a mounting bracket 34 which is attachable to the arch frame 10 in a series of different locations. Opposite the back plate 32 the fan housing defines a circular inlet opening 36 which is covered by an apertured screen plate 38. The screen plate 38 is held in place by bolts 39 passing through aligned holes in an inlet ring 40, the housing 24, and a flange 42 of an inlet cone 44 and the screws also engaging into a retaining ring 45 positioned around the inlet 36 in the interior of the housing 24. The inlet cone forms a duct leading to the hollow center of the fan impeller 26. Within the housing 24 the impeller 26 is coupled to the drive shaft 28 and is surrounded by a peripheral discharge screen 46 that is provided for safety to prevent accidental contact with the fan impeller 26. Radially outwardly of the discharge screen 46 the housing 24 defines an annular volute chamber which communicates with a radial outlet duct 48.

Figure 2:
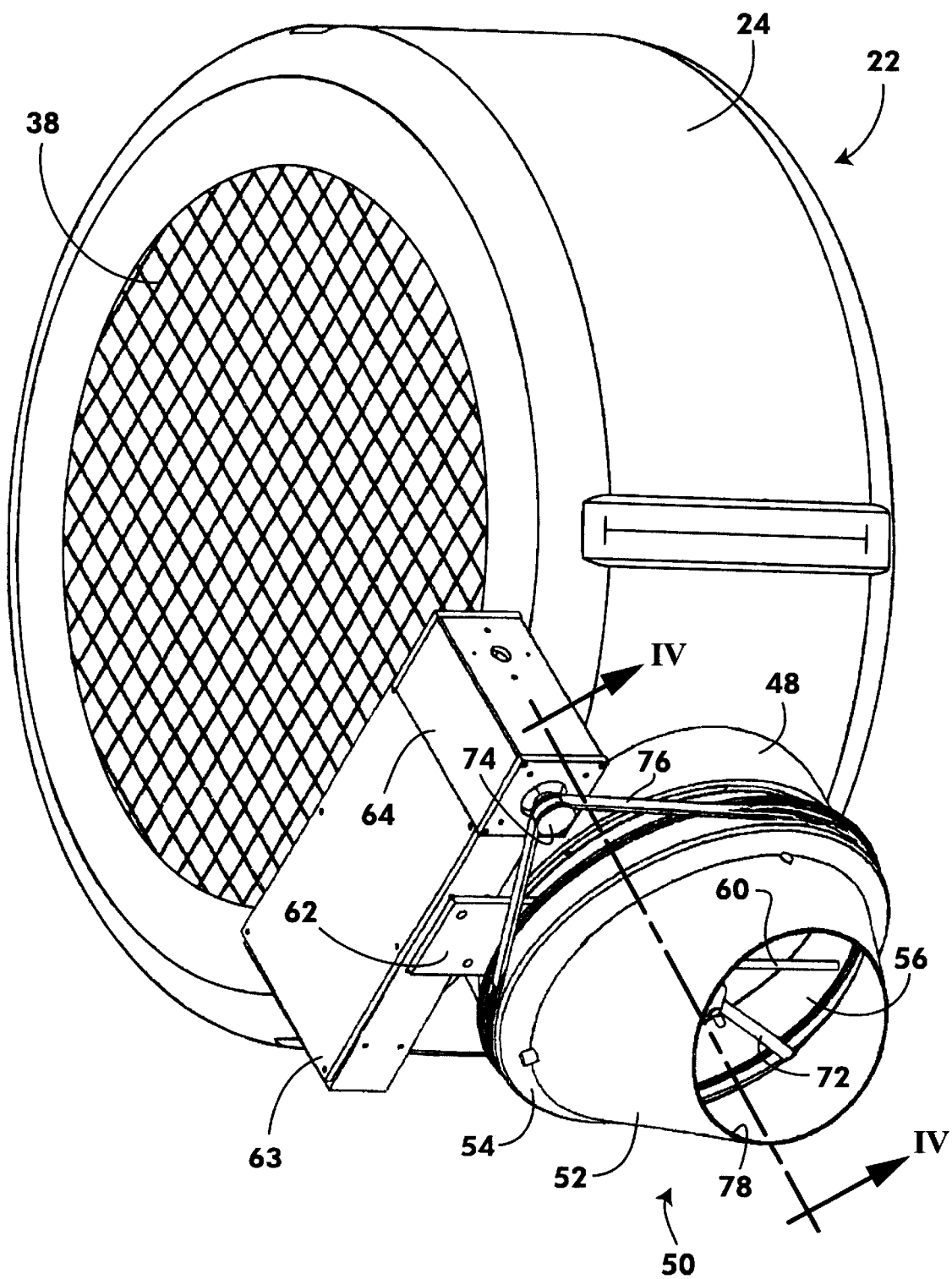
FIG. 2 is an isometric view to a larger scale showing a blower unit of the drying station.
Figure 5:
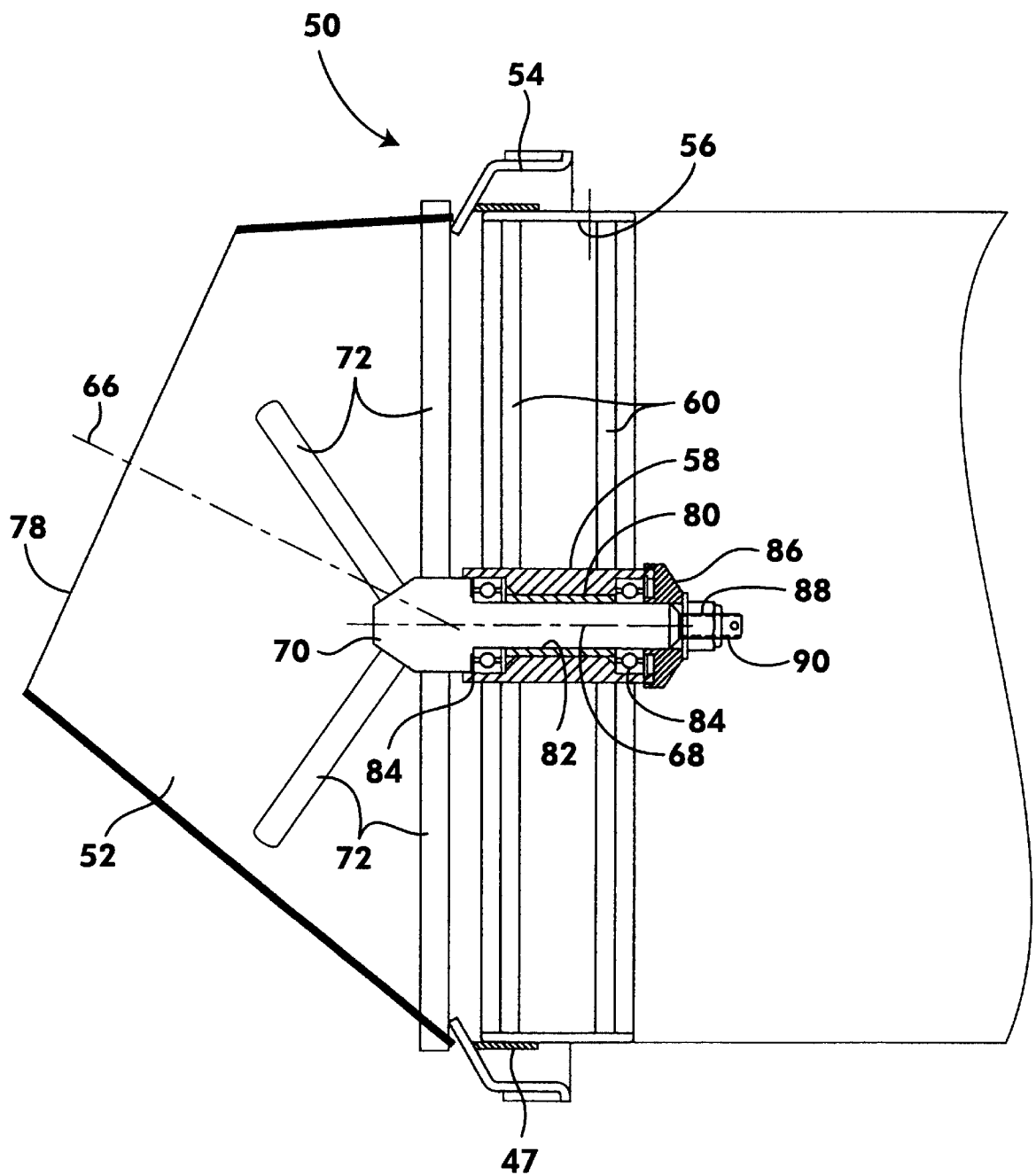
FIG. 5 is a sectional view of the blower unit taken on the line IV—IV in FIG. 2.
Figure 6:
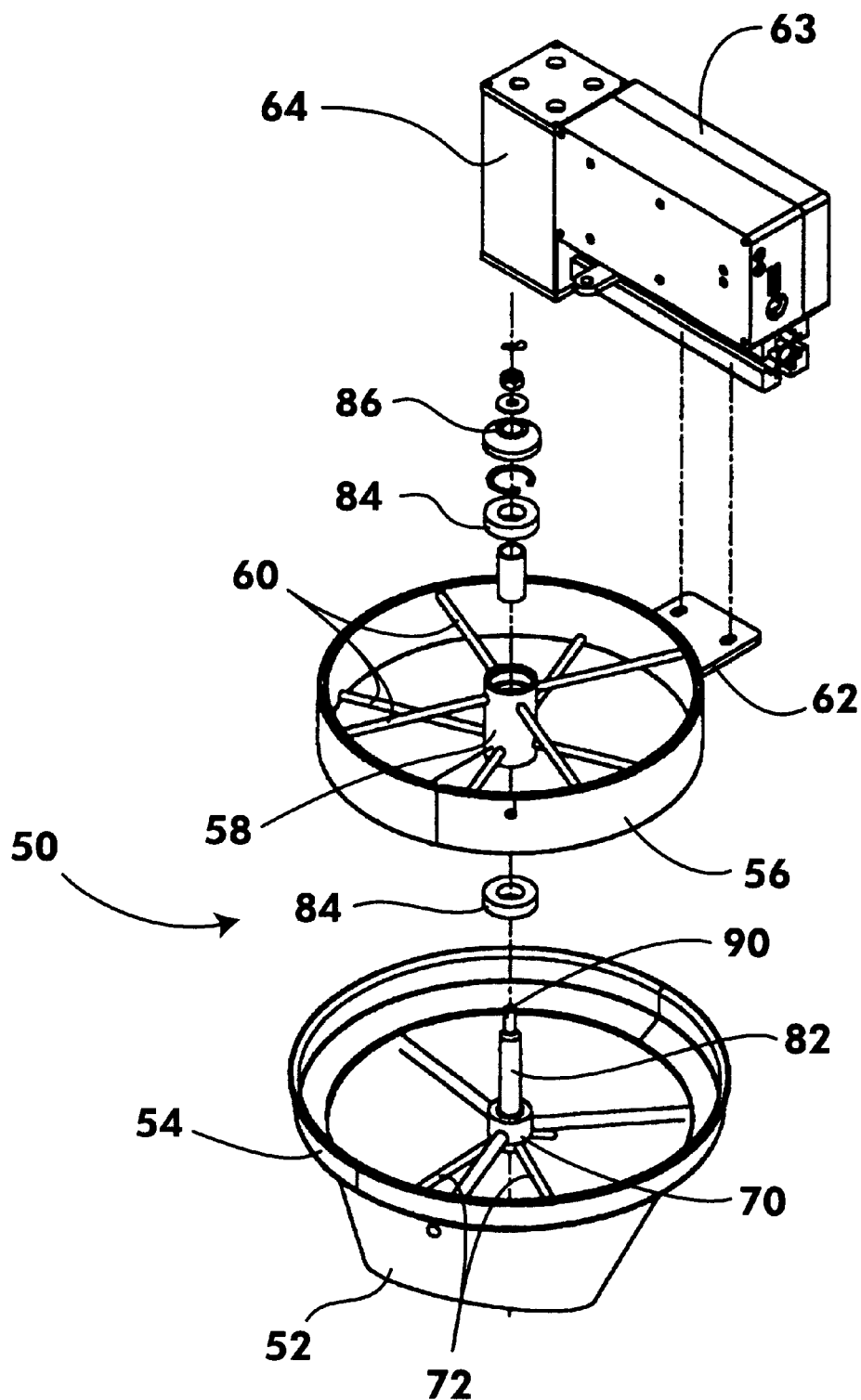
FIG. 6 is an exploded perspective view of a nozzle portion of the blower of the drying system.

The outlet duct 48 has mounted thereon a discharge nozzle 50, details of which are best shown in FIGS. 2, 5 and 6. With reference particularly to FIGS. 5 and 6, the discharge nozzle 50 comprises a truncated hollow oblique nozzle cone 52 having an enlarged annular base flange 54 which surrounds a bearing ring 56 that is carried in the outlet duct 48 of the blower housing 24. A seal 47 carried on the ring 56 to prevent the escape of air between the base flange 54 and the bearing ring 56. The bearing ring 56 is secured detachably to the outlet duct 48 by means of screws (not shown) and includes a central axial tubular hub 58 supported by an array of radial spokes 60. The ring 56 also carries an integral rectangular flange 62 which projects radially outwardly through an annular gap between the nozzle flange 54 and the outlet duct 48 and provides a mounting support for the housing of a control mechanism 63 which controls operation of a nozzle adjustment motor 64.

The form of the nozzle cone 52 is most clearly shown in FIG. 5 as being of truncated oblique conical form, with a cone axis 66 extending angularly with respect to the axis 68 of the bearing ring 56 and of outlet duct 48. The nozzle cone 52 is supported from a central mounting hub 70 by a series of generally radially projecting angularly spaced rods 72.

The tubular hub 58 of the bearing ring supported by the spokes 60 carries therein a central co-axial bearing bush 80 which rotatably receives a spindle 82 attached to the mounting hub 70, opposite ends of the hub 58 supporting ball bearings 84 which run between the hub and the spindle 82. The spindle 82 and mounting hub 70 are secured to the hub 58 by a retaining ring 86 held in position by a nut 88 which engages a threaded extension 90 of the spindle 82.

Figure 3:
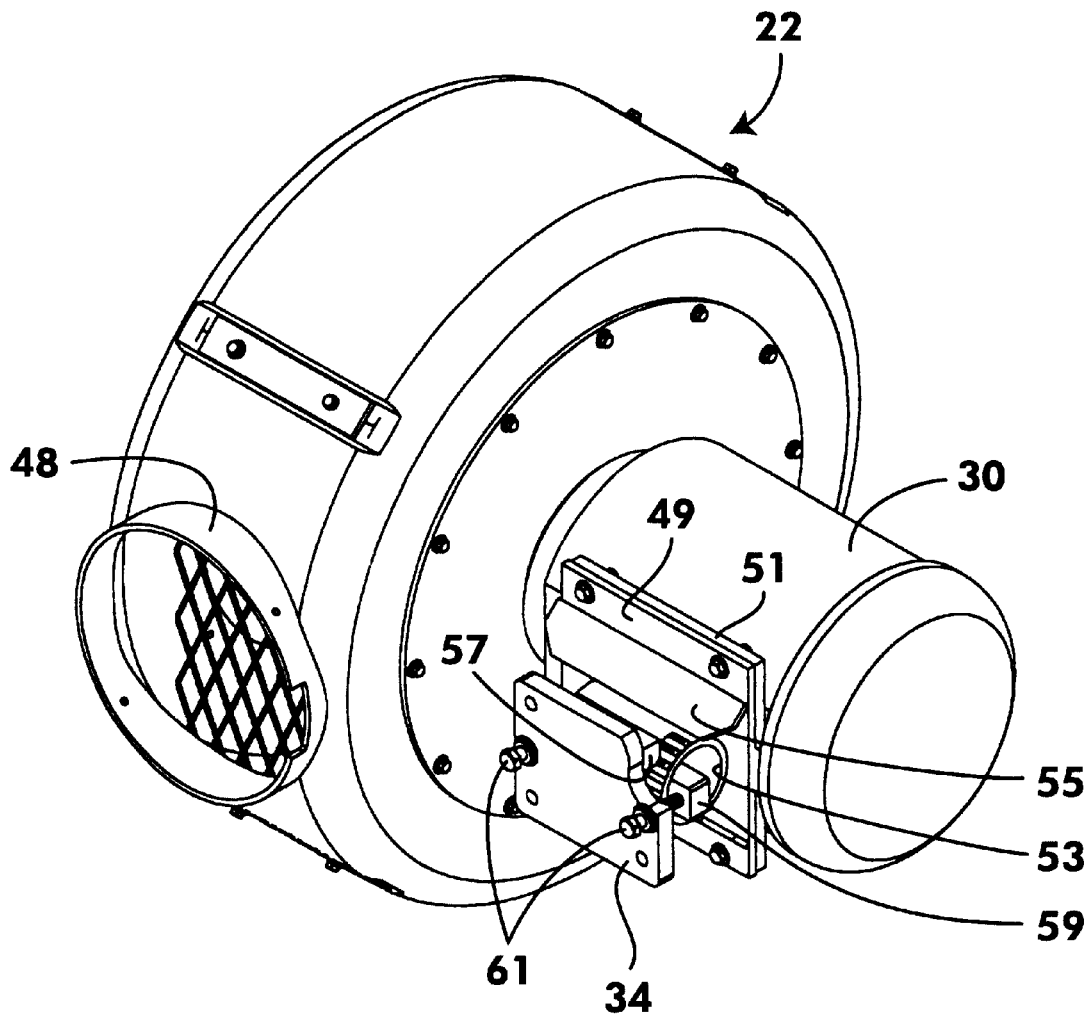
FIG. 3 is an isometric view to a somewhat smaller scale than FIG. 2 and showing the opposite side of the lower unit.

In FIG. 3 (where the blower 22 is shown without the discharge nozzle 50) details of the mounting structure for the blower 22 are evident. The mounting arrangement includes a base plate 49 that is bolted to an integral flange plate 51 on the electric motor housing 30, and the mounting bracket 34 which has bolt holes for attachment to one of the posts 16 or any other suitable part of the arch frame 10.

An adjustment mechanism is provided between the base plate 49 and the mounting plate 34 to enable adjustment of the attitude of the blower 22 in a plane perpendicular to the blower housing axis. As seen in FIG. 3 the base plate 49 has on one side a rigid tubular socket 53 which extends parallel to the axis of the motor 30 and which is supported on opposite sides between a pair of angled gusset plates 55 to form a rigid structure. The mounting bracket 34 has on one side thereof a pair of spaced parallel projecting ribs 57 which extend longitudinally and each of which has a chamfered corner presented towards the tubular socket 53. The ribs 57 are spaced apart to cradle the socket 53 therebetween. A clamping bar 59 extends through and beyond the ends of the tube 53 and in its end portions has holes that are in screw threaded engagement with a pair of cap screws 61 which pass through apertures in the mounting bracket 34.

From the foregoing it will be appreciated that when the screws 61 are tightened to draw the clamping bar 59 towards the bracket 34, the tubular socket 53 will be drawn into contact with the chamfered edges of the ribs 57. Thus tightening of the screws 61 is effective to clamp the socket 53 into rigid engagement with the mounting bracket 34 so that the blower 22 is securely held in fixed relation to the mounting bracket 34 and through this to the structural part of the arch frame to which the latter is attached. It will be recognized that when the cap screws are slackened, the blower 22 can be moved angularly in a plane that is normal to the axis of the tubular socket 53 (and of the blower itself, this adjustment movement being accommodated by angular movement of the wall of the socket 53 between the clamping bar 59 and the ribs 57. When a desired position of adjustment is reached the cap screws 61 are re-tightened to securely fix the blower 22 in a selected attitude. Registration marks can be provided on the end of the tubular socket 53 at angularly spaced locations to indicate desired positions of adjustment relative to a datum indicator on the mounting bracket 34.

As shown in FIG. 2, the motor 64 has a drive pulley 74 projecting therefrom adapted to be driven by the motor. A flexible drive belt 76 is looped around the drive pulley 74 and the enlarged annular flange 54 of the nozzle cone 52. Thus the open base of the nozzle cone 52 is in communication with the duct 48 and provides a means for directing air flow from the duct 48 to an outlet end 78 of the nozzle, air flow discharged from the nozzle being directed generally parallel to the cone axis 66 by virtue of the nozzle configuration.

From the foregoing it will be appreciated that the nozzle cone 52 is rotatable with respect to the outlet duct 48 of the blower 22 under control of the motor 64 which effects angular adjustment in the orientation of the nozzle cone 52 through the drive pulley 74 and the drive belt 76 in engagement with the nozzle flange 54.

The nozzle adjustment motor 64 is a stepping motor which acts under direction from the control electronics to control the speed, direction, and magnitude of the movements of the rotatable nozzle. The control unit 63 may for example contain a stored program and a group of storage elements for retaining control values for a series of movements of the nozzle 50. When the nozzle is moved to a selected point in its range of rotation, it directs the air stream to a desired location on the vehicle. Furthermore, the nozzle could be arranged to oscillate continuously between two selected points, thus sweeping the air stream over a selected area of the vehicle passing by the dryer installation.

Referring now to FIG. 1 it will be noted that the mounting brackets 34 can be utilized to position the blowers 22 at many different locations vertically with respect to the posts 16, and laterally and longitudinally in a horizontal plane with respect to the cross member 20. The angular orientation of the outlet duct 48 with respect to the mounting bracket 34 can be adjusted angularly in a plane normal to the axis of the motor drive shaft 28, by the above described mechanism shown in FIG. 3.

In a typical dryer section of a car wash installation, some of the blowers will be positioned to direct a flow of drying air at a constant orientation with respect to a vehicle passing along the track 12. In that case the drive motor 64 can be omitted and orientation of the nozzle cone 52 with respect to the outlet duct 48 can be set manually. A drying section provided with blowers 22 as discussed above lends itself to the application of automatic controls driven by sensors both to initiate operation of the blowers and to control the direction of the air streams delivered by the nozzles 52 in accordance with various features of the vehicles to be dried.

Figure 4:
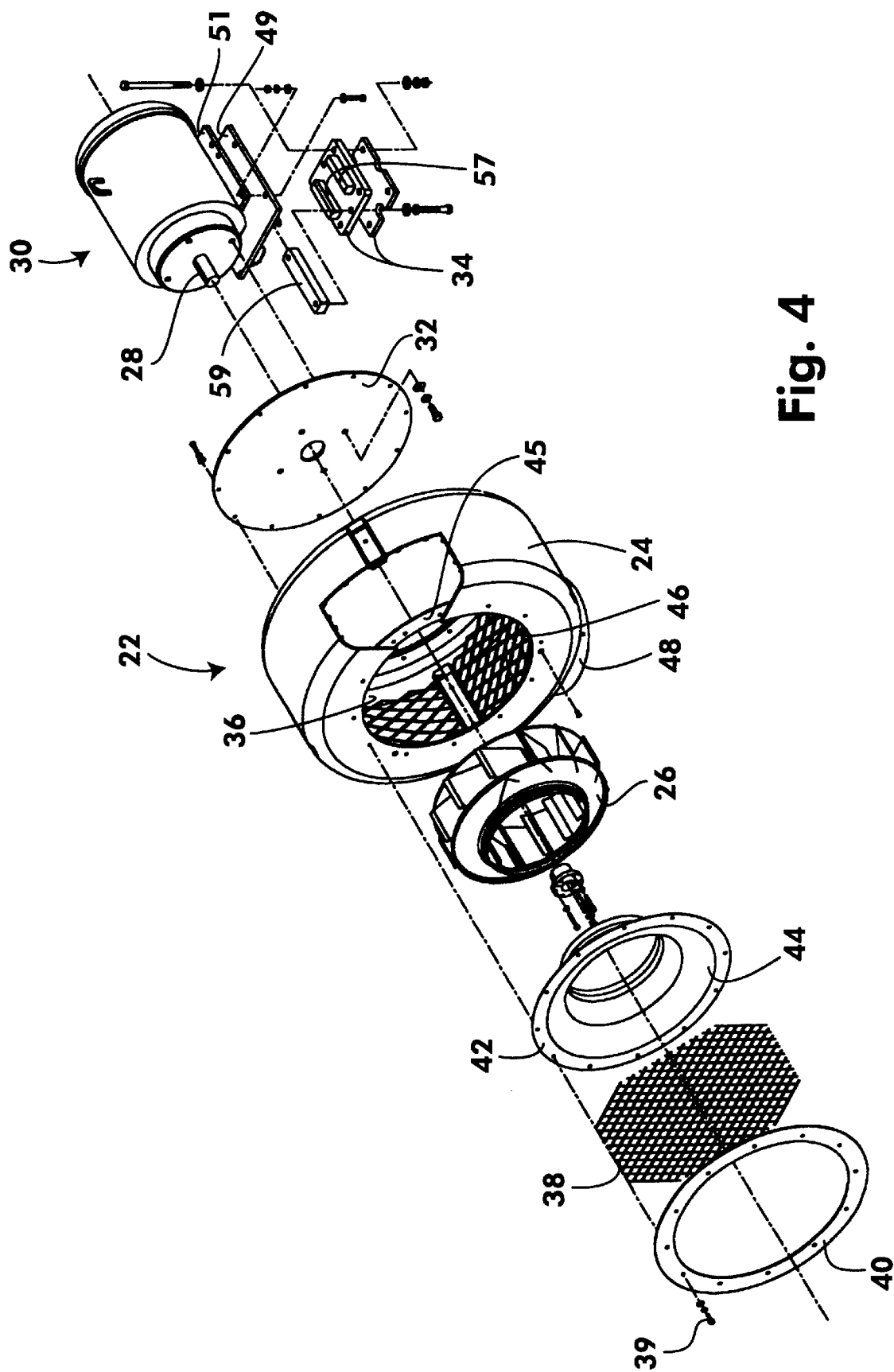
FIG. 4 is an exploded perspective view of the blower unit.

The discharge screen 46 surrounding the fan impeller as shown partially in FIGS. 3 and 4 provides important advantages from the standpoint of safety. A problem with prior art dryers, especially those with housings made of lightweight materials (e.g. rotationally molded plastic or thin aluminum sheets) concerns the possibility of structural failure of the fan. Debris in the form of wax, scale, dust etc., can build up unevenly on the fan impeller causing an imbalance in the rotating mass. Left uncorrected this imbalance can lead to structural failure. When this occured with prior art fans, pieces of the fan could be ejected through the housing. Furthermore sharp pieces could be dragged around the inside of the housing cutting a groove in the housing material deep enough to sever the housing, thus allowing escape of other pieces. To avoid these problems, the discharge screen 46 of the fan shown in the drawings completely surrounds the periphery of the fan impeller 26 and is formed of a heavy gauge expanded metal such as steel. The discharge screen 46 is securely anchored to the fan housing and has relatively large diamond-shaped openings therein. This open mesh construction of the screen 46 causes minimal restriction of the fan airflow and so does not noticeably decrease the efficiency of the blower. The diamond-shaped holes in the screen act to straighten the airflow and reduce turbulence in it which in turn improves the fan efficiency and allows the nozzle to better control the direction of the airflow. Furthermore reducing turbulence reduces the noise emitted from the dryer.

It will be appreciated that the screen 46 greatly enhances the ability of the housing to resist penetration or damage by pieces thrown off from the fan, and its interrupted form will quickly dull any sharp edges of pieces dragged along it by the impeller, and thus it totally eliminates the grooving problem described above. It also helps to decrease the noise transmitted through the housing during normal operation, making the fan quieter.

Referring to FIG. 7, a schematic diagram of the control circuit for the blowers of a dryer station installed in an automatic car wash system is shown. Positioned alongside the track 12 over which the vehicles (not shown) are advanced are a number of sensors which are located to respond to the presence of a vehicle or specific parts thereof in proximity to the arch 10 to control operation of the blowers 22 in conjunction with a control program incorporated in the control mechanism 63. These sensors comprise as shown in FIG. 7 a front/rear position signal sensor 100, a tire signal sensor 102 and a width signal sensor 104. Signals from these three sensors are fed into the nozzle control mechanism 63 along with an AC power supply 106 through a ten pin connector 108. In response to these signals the nozzle motor is driven to provide the appropriate air flow conditions from the dryer. Thus when the sensor 100 is actuated, the dryer nozzles 50 are oriented to direct drying air towards the front or towards the rear of a vehicle as appropriate. The sensor 102 is positioned to be actuated by a front wheel of the vehicle whereupon one or more of the nozzle motors 64 is actuated to orient the associated nozzle to provide a flow of drying air onto the wing mirror of the vehicle. The nozzle 104 is positioned to detect when a wider than normal vehicle moves along the track 12 and to effect adjustment of the drying air flows accordingly.

As shown in FIG. 7 the control mechanism 63 includes a control panel 112 which can be actuated e.g. through infrared rays from a remote controller 114. Furthermore, the control mechanism 63 of one of the blowers 22 can be coupled to the control mechanism of one or more additional blowers through a fibre optic cable 116 so that the blowers can be coupled to act conjointly. The cable 116 provides a fibre optic link which can be used to synchronize the direction of motion between multiple nozzles to promote cooperation of the individual air flows (and prevent contradiction) in providing an efficient drying action. Through the cable the nozzles can also communicate in series by sending the input information to each other to eliminate the necessity of individually wiring each nozzle to the control panel 112.

By arraying a number of blowers 22 as described above and illustrated in the drawings adjacent to the vehicle path or track 12, the entire vehicle can be dried as it passes through the arch frame 10. Multiple air streams are swept over the vehicle, and the data supplied by the sensors is used to synchronize movement of the individual nozzles so that the air streams from the different nozzles cooperate with one another to improve the effectiveness of the drying action.

An infrared receiver (not shown) within the control unit 63 responds to signals from the remote control transmitter 114. The stored program in the control unit decodes the signals to respond to input commands to program the unit to move the nozzle 50 through a predetermined program. It will be appreciated that in this way the dryer installation can be readily adapted to the requirements of different installations.

It should be understood that while for clarity certain features of the invention are described in the context of separate embodiments, these features may also be provided in combination in a single embodiment. Furthermore, various features of the invention which for brevity are described in the context of a single embodiment may also be provided separately or in any suitable sub-combination in other embodiments.

Moreover, although particular embodiments of the invention have been described and illustrated herein, it will be recognized that modifications and variations may readily occur to those skilled in the art, and consequently it is intended that the claims appended hereto be interpreted to cover all such modifications and equivalents.

What is claimed is:

1. An air blower comprising:
   a housing enclosing a fan, said housing having inlet and outlet ports for flow of air through said housing upon operation of said fan;
   a nozzle carried by said housing to deliver a flow of air therefrom said nozzle having a length direction;
   wherein said nozzle has a base carried on said housing in communication with and surrounding said outlet port, said nozzle being rotatable relative to said housing about an axis, said nozzle being tapered in cross section from said base towards an outlet end of said nozzle, said nozzle being mounted with the length direction thereof oriented at an acute angle relative to said axis such that rotation of said nozzle about said axis is effective to adjust said length direction through a conical path.

2. An air blower as claimed in claim 1 wherein said nozzle is generally of oblique frusto-conical form.

3. An air blower as claimed in claim 1 wherein said nozzle is mounted on said housing by means of an annular bearing that surrounds said outlet port.

4. An air blower as claimed in claim 3 wherein said nozzle base is engaged by a drive element that is operative to effect rotational adjustment of said nozzle.

5. An air blower as claimed in claim 4 wherein said drive element is an endless flexible belt which loops around said nozzle base and a motor-driven pulley.

6. An air blower comprising:
a housing that encloses a power driven fan, said housing including an air inlet port and an air outlet port, a nozzle comprising a hollow tubular body having a predetermined length and including an open base end providing an inlet and an opposite open end providing an outlet, said base end defining a circular profile that lies in a plane extending at an acute angle with respect to the length of the tubular member, said nozzle being carried on a rotatable mounting in said housing by said circular base profile with the open base in communication with said air outlet port, air delivered by said fan being blown through the opposite end of the nozzle in a predetermined direction in accordance with the orientation of said nozzle with respect to the housing outlet port;
said air blower further including drive means that is selectively operable to position said nozzle in a predetermined orientation relative to said air blower housing.

7. An air blower as claimed in claim 6 wherein said drive means is a powered drive element that is selectively operable to angularly change the position of said nozzle about said rotatable mounting.

8. An air blower comprising:
a housing enclosing a fan, said housing having inlet and outlet ports for flow of air through said housing upon operation of said fan;
a nozzle having a length direction, said nozzle carried by said housing to deliver a flow of air therefrom in the length direction of the nozzle;
said nozzle having a base that is carried on said housing in communication with and surrounding said outlet port, said nozzle being angularly movable relative to said housing about an axis, said nozzle being oriented such that its length direction makes an acute angle relative to said axis;
said nozzle being selectively adjustable in position angularly about said axis to achieve a selected orientation of the length direction of the nozzle and hence of the direction of flow of air delivered thereby.

9. A vehicle car wash installation wherein successive vehicles are moved longitudinally with respect to washing and drying equipment, said installation comprising a frame carrying at least one air blower as set forth in claim 8, the air blower being positioned such that said flow of air can be directed onto a vehicle passing through said installation.

10. A car wash installation as claimed in claim 9 wherein at least one said air blower is attached to a drive element that is controllable to effect driving rotation of said nozzle and hence adjustment of said flow direction.

11. A car wash installation as claimed in claim 10 including at least one air blower that is adapted to be positioned in an orientation to provide a flow of air in a constant direction.

12. A car wash installation as claimed in claim 10 wherein said frame is an arch frame extending upwardly at each side and horizontally across the top of a vehicle drying location, said frame including a plurality of said air blowers.

13. A car wash installation as claimed in claim 12 wherein said arch frame is adapted for mounting in a fixed location in said installation.

14. A car wash installation as claimed in claim 9, said installation including sensors to detect at least one of:
approach of a vehicle towards said frame;
departure of a vehicle from said frame;
the location of a wheel of a vehicle; and
the location of a selected surface of said vehicle;
said installation further including a control system, each said sensor being operatively coupled to deliver data to said control system;
said control system in turn being coupled to said at least one blower to vary the air flow delivered by said blower in accordance with the data received from said at least one sensor.

15. An air blower as claimed in claim 1 wherein said fan is a radial flow impeller mounted to rotate within said housing, said housing including a tubular mesh screen securely anchored therein and surrounding said impeller, said mesh screen being of heavy gauge expanded metal construction.

16. An air blower as claimed in claim 8 and further comprising:
a powered drive acting on said nozzle to change the orientation of said nozzle being selectively adjustable in position angularly about said axis to achieve a selected orientation of the length direction of the nozzle and hence of the direction of flow of air delivered thereby.

17. An air blower as claimed in claim 16 wherein said drive is operative to oscillate said nozzle about said axis between two selected points.

18. An air blower as claimed in claim 16 wherein said drive is operative to rotate said nozzle continuously about said axis.

19. An air blower as claimed in claim 18 wherein said nozzle has a base that is mounted on said housing by means of an annular bearing that surrounds said outlet port, said nozzle base being engaged by a drive element that is operative to effect rotational adjustment of said nozzle about said axis.

20. An air blower as claimed in claim 19 wherein said drive element is an endless flexible belt which loops around said nozzle base and a motor-driven pulley.

* * * * *